United States Patent
Pott

[11] 3,744,154
[45] July 10, 1973

[54] TEACHING DEVICE

[76] Inventor: Dorothy E. Pott, Route 1, Pulaski, Wis. 54162

[22] Filed: Feb. 24, 1972

[21] Appl. No.: 229,098

[52] U.S. Cl. ............................................. 35/35 R
[51] Int. Cl. .............................................. G09b 1/06
[58] Field of Search ................. 35/35 R, 35 E, 35 F, 35/35 G, 35 H, 35 J, 75

[56] References Cited
UNITED STATES PATENTS
1,019,545 3/1912 Southworth ..................... 35/35 F X
1,833,793 11/1931 Pfleger ............................. 35/35 F X
698,603 4/1902 Wiederseim ..................... 35/35 E X
2,982,032 5/1961 Cooke .............................. 35/35 R X Primary Examiner—Wm. H. Grieb
Attorney—James E. Nilles

[57] ABSTRACT

A teaching device comprises a first or center segment having a root word inprinted thereon. One or more second end segments are pivotably attached to one end of the first segment and each segment contains a prefix for the root word. One or more third end segments are pivotably attached to the other end of the first segment and each segment contains a suffix for the root word. In use, the device is displayed so that the root word alone or in combination with any one of the prefixes or suffixes is visible. This is accomplished by moving the second and third segments individually into positions wherein the prefix or the suffix or both are properly associated with the root word. When the teaching device is not in use, the second and third segments overlap the first segment and the first segment is folded.

8 Claims, 6 Drawing Figures

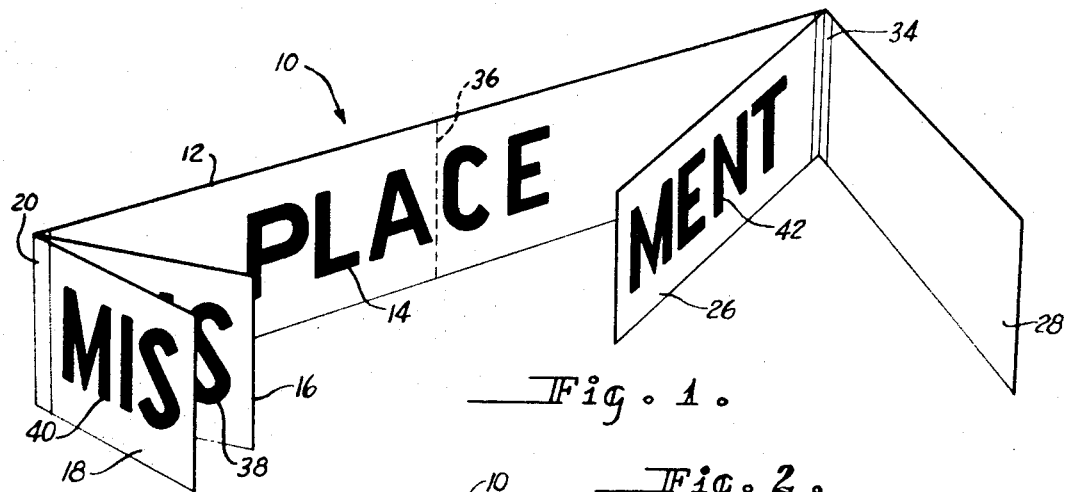
Fig. 1.
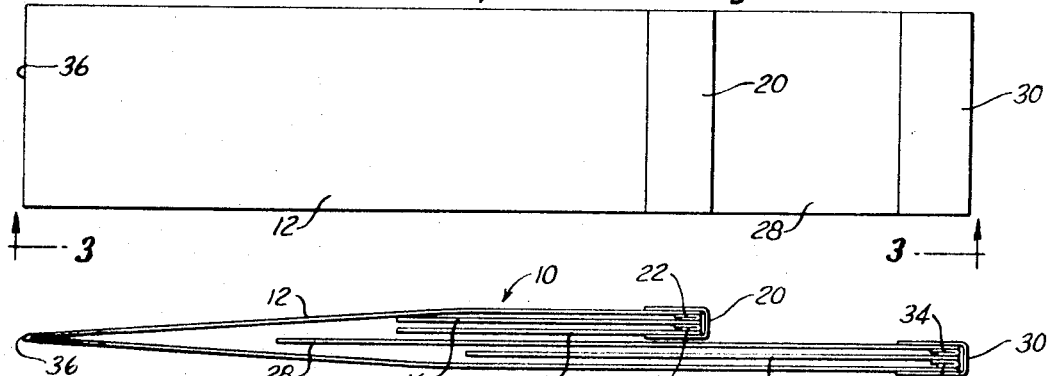
Fig. 2.
Fig. 3.
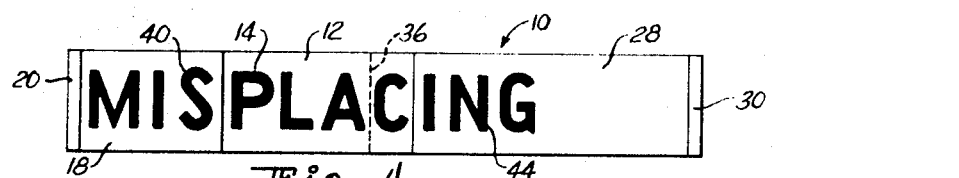
Fig. 4.
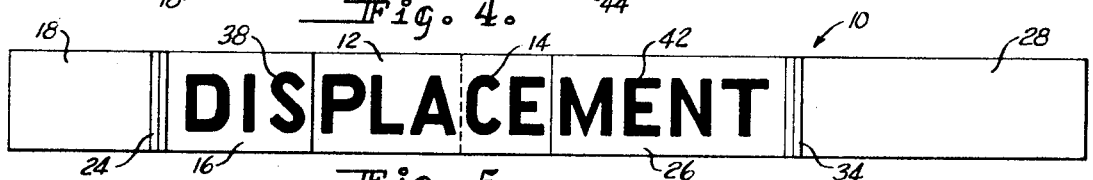
Fig. 5.
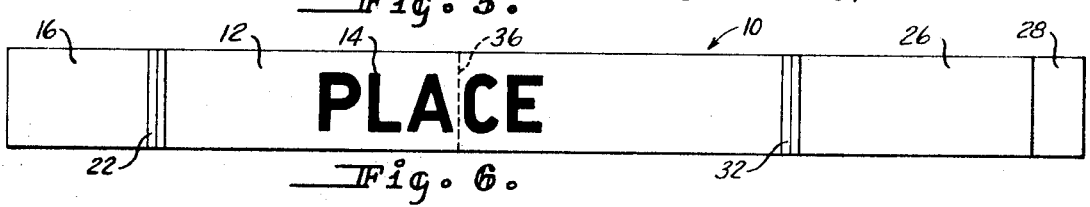
Fig. 6.

TEACHING DEVICE

BACKGROUND OF THE INVENTION

1. Field of Use

This invention relates generally to teaching devices. In particular, it relates to a teaching device wherein prefixes and suffixes may be selectively associated with a root word.

2. Description of the Prior Art

Various types of teaching devices are available for teaching word construction, grammar and spelling. It is known to provide teaching devices wherein a word is broken into its component parts and the component parts are then displayed in various meaningful combinations. U. S. Pat. No. 2,982,032, issued May 2, 1961 to Cooke for "Educational Device for Teaching Syllables of Words" discloses a teaching device of the aforesaid character wherein component parts of words are presented on individual separable segments and wherein the segments are adapted to be physically joined in such a manner so as to place the component parts of the word in rational order. One disadvantage of some prior art teaching devices of this type is that the segments containing component parts of words are physically separable and, therefore, difficult to manipulate, easily lost, subject to possible error in assembly and time-consuming to use.

SUMMARY OF THE INVENTION

A teaching device in accordance with the present invention is particularly well adapted for teaching root words and appropriate prefixes and suffices therefor but could be utilized to teach other subjects besides language.

A teaching device in accordance with the present invention comprises a first segment, preferably fabricated of cardboard or stiff paper or the like and rectangular in form, on which meaningful indicia such as a root word is imprinted for display. The teaching device further comprises a second or end segment, also fabricated of cardboard, heavy paper or the like and rectangular in form, on which other indicia such as a portion of a word or a prefix for the root word is printed for display. Means are provided to movably attach or hinge the second segment to the first segment so that the second segment can be moved into a position wherein the prefix is properly associated with the root word. Such means take the form, for example, of a piece of flexible tape which adheres to the rear side of the first segment and the front side of the second segment. The teaching device also comprises a third or end segment, also fabricated of cardboard, heavy paper or the like and rectangular in form, on which other indicia such as a portion of a word or a suffix for the root word is imprinted for display. Means are provided to movably attach or hinge the third segment to the first segment so that the third segment can be moved into a position wherein the suffix is properly associated with the root word. Such means take the form, for example, of a piece of flexible tape which adheres to the rear side of the first segment and the front side of the third segment. In use, the teaching device can be displayed so that only the root word on the first segment is visible. Furthermore, either the second segment containing a prefix or the third segment containing a suffix or both segments can be moved, folded or swung into position so as to be displayed in proper association with the root word. When the second or third segment is swung out of position, the prefix or suffix, as the case may be, is not visible to the observer of the root word.

A teaching device in accordance with the invention can employ one or more second segments, each containing a different appropriate prefix, and each movably attached to the first segment of the teaching device. The device can also employ one or more third segments, each containing a different appropriate suffix, and each movably attached to the first segment. When not in use, the second and third segments overlie the first segment and the latter may be folded for compactness.

A teaching device in accordance with the invention is especially well-adapted for use as a language teaching aid but could employ related indicia other than words and letters. When used as a language teaching aid and employing root words, prefixes and suffixes, the teaching device is valuable in teaching and learning spelling, root words, the concept of prefixes and suffixes, synonyms and antonyms and increasing the vocabulary. The teaching device is constructed so as to make root words prefixes and suffixes very evident and easy to isolate. The fact that a plurality of both prefixes and suffixes are associated with the same root word enables the student to be exposed to a greater combination of possible words. Beginning with a root word, a prefix or suffix may alone be added first and then both may be employed together to build many words. The flash-card concept and the flexibility embodied in the teaching device makes it a valuable drilling device for classroom teaching, individualized instruction, or self-teaching. The device makes language instruction more interesting, challenging and exciting and provides an incentive to learning. Its flexibility in possible word combinations takes into account differences in grade level and makes spelling more challenging. The device is simple and convenient to use and has no detachable parts that can be misplaced, lost, or improperly assembled.

DRAWINGS

FIG. 1 is a perspective view of one embodiment of a teaching device in accordance with the present invention;

FIG. 2 is a plan view of the device when folded;

FIG. 3 is an enlarged side view of the device taken on line 3—3 of FIG. 2;

FIG. 4 is a plan view of the device showing the middle segment unfolded and the associated end segments folded inwardly;

FIG. 5 is a view similar to FIG. 4 but showing the left end segment folded outwardly; and FIG. 6 is a view similar to FIG. 4 but showing the left end and right end segments folded outwardly.

DESCRIPTION OF A PREFERRED EMBODIMENT

FIGS. 1 through 6 show a teaching device 10 in accordance with the present invention. Device 10, which is fabricated of cardboard, stiff paper or the like, comprises a rectangular first or center segment 12 with a root word 14, such as "PLACE" imprinted or otherwise provided on the front surface thereof.

Device 10 also comprises at least one but preferably a plurality of second end segments, designated 16 and 18, which are hinged or pivotably attached to the left edge of center segment 12 by suitable means such as flexible adhesive tapes 20, 22 and 24. As FIG. 3 shows, tape 20 is secured to the rear side of center segment 12 and to the front side of segment 18. Tape 22 is secured to the front side of center segment 12 and the rear side of segment 16. Tape 24 is secured to the front side of segment 16 and the rear side of segment 18.

Device 10 also comprises at least one but preferably a plurality of third end segments, designated 26 and 28, which are hinged or pivotably attached to the right edge of center segment 12 by suitable means such as flexible adhesive tapes 30, 32 and 34. As FIG. 2 shows, tape 30 is secured to the rear side of center segment 12 and to the front side of segment 28. Tape 32 is secured to the front side of center segment 12 and the rear side of segment 26. Tape 34 is secured to the front side of segment 26 and the rear side of segment 28.

Center segment 12 of device 10 is adapted to be folded for compactness along a fold-line 36 which is slightly off-center and to the left of the true centerline of center segment 12.

As FIGS. 4 and 5 show, segment 16 bears a prefix 38 (DIS) on its front side; segment 18 bears a prefix 40 (MIS) on its front side; segment 26 bears a suffix 42 (MENT) on its front side; and segment 28 bears a suffix 44 (ING) on its front side.

It is to be noted that segment 28 (containing suffix 44 (ING) is longer than segment 26 and that when in place it overlaps the letter E in root word 14 to provide for correct spelling in the event the root word and that suffix are combined.

OPERATION

Device 10 is operated as a teaching aid as follows. First, device 10 is unfolded from the folded condition shown in FIGS. 2 and 3. Then a choice is made whether to display root word 14 (PLACE) alone or in some combination with the prefixes and suffixes. If the root word 14 (PLACE) is to be displayed alone, the prefix segments 16 and 18 and the suffix segments 26 and 28 are folded back, as shown in FIG. 6, so that only the root word 14 (PLACE) is visible to the observer. If the root word 14 (PLACE) is to be displayed in combination form, several choices are available. FIG. 5, for example, shows prefix segment 16 folded over so that the prefix 38 (DIS) is properly associated with root word 14 (PLACE). FIG. 5 also shows suffix segment 26 folded over so that the suffix 42 (MENT) is properly associated with root word 14 (PLACE). However, either one or the other segments 16 and 26 could be used alone with the root word 14 on segment 12. FIG. 4, for example, shows both prefix segments 16 and 18 folded over so that the prefix 40 (MIS) is properly associated with root word 14 (PLACE). FIG. 4 also shows suffix segments 26 and 28 folded over so that the suffix 44 (ING) is properly associated with root word 14 (PLACE). However, none, either or both of the prefix segments 16 and 18 could be used with none, either or both of the suffix segments 26 and 28.

The invention as disclosed herein employs a particular root word and a plurality of suitable prefixes and a plurality of suitable suffixes therefor. However, other root words, prefixes and suffixes could be employed. Furthermore, although two second or prefix segments and two third or suffix segments are employed, more or less than this number could be employed with a single center segment if suitable hinge means are provided.

Depending on the root word and prefix or suffix chosen, the prefix and suffix segments are proportioned size-wise so as to overlap and cover any letter or letters in the root word which need to be deleted for proper spelling and usage.

I claim:
1. In a teaching device:
a flat first segment having front and rear sides and top, bottom and end edges, said first segment having a root word on the front side thereof disposed between said end edges;
a plurality of flat second segments movably associated with one end of said first segment, each of said second segments having front and rear sides and top, bottom and end edges, each of said second segments having one or more letters on the front side thereof disposed between the end edges thereof for meaningful combination with said root word to modify its significance, at least one of said plurality of second segments being longer between its end edges than another of said second segments, and hinge means for movably connecting each of said second segments at an end edge thereof to an end edge of said first segment,
each of said second segments being movable to one position wherein said letters thereon are not visible to an observer of said root word and being further movable to another position wherein said letters thereon are visible to an observer of the root word and properly and meaningfully associated with said root word, said one of said second segments when in its said other position overlapping and concealing at least one letter of said root word.

2. A teaching device according to claim 1 wherein said first segment is fabricated of stiff but foldable material and is provided with a fold line extending between said top and bottom edges thereof.

3. A teaching device according to claim 1 including at least one flat third segment movably associated with the other end of said first segment, said third segment having front and rear sides and top, bottom and end edges, said third segment having one or more letters on the front side thereof disposed between the end edges thereof for meaningful combination with said root word to modify its significance, and hinge means for movably connecting said third segment at an end edge thereof to the other end edge of said first segment, said third segment being movable to one position wherein said letters thereon are not visible to an observer of said root word and being further movable to another position wherein said letters thereon are visible to an observer of the root word and properly and meaningfully associated with said root.

4. A teaching device according to claim 3 wherein said first segment is fabricated of stiff but foldable material and is provided with a fold line extending between said top and bottom edges thereof.

5. A teaching device according to claim 3 including a plurality of said third segments movably associated with said other end of said first segment.

6. A teaching device according to claim 5 wherein said first segment is fabricated of stiff but foldable material and is provided with a fold line extending between said top and bottom edges thereof.

7. A teaching device according to claim 5 wherein at least one of said plurality of third segments is longer between its end edges than another of said third segments so as to overlap and conceal at least one letter of said root word when said one third segment is in its other position.

8. A teaching device according to claim 7 wherein said first segment is fabricated of stiff but foldable material and is provided with a fold line extending between said top and bottom edges thereof.

* * * * *